(12) United States Patent
Sendhoff et al.

(10) Patent No.: US 10,083,605 B2
(45) Date of Patent: Sep. 25, 2018

(54) METHOD AND SYSTEM FOR ASSISTING A DRIVER IN DRIVING A VEHICLE AND VEHICLE ON WHICH SUCH SYSTEM IS MOUNTED

(71) Applicant: HONDA RESEARCH INSTITUTE EUROPE GMBH, Offenbach/Main (DE)

(72) Inventors: Bernhard Sendhoff, Offenbach (DE); Martin Heckmann, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 0 days.

(21) Appl. No.: 15/586,431

(22) Filed: May 4, 2017

(65) Prior Publication Data
US 2018/0005526 A1 Jan. 4, 2018

(30) Foreign Application Priority Data
Jun. 30, 2016 (EP) ..................................... 16177118

(51) Int. Cl.
*G08G 1/00* (2006.01)
*G08G 1/0967* (2006.01)
(Continued)

(52) U.S. Cl.
CPC ........... *G08G 1/0967* (2013.01); *B60W 50/08* (2013.01); *G08G 1/09623* (2013.01);
(Continued)

(58) Field of Classification Search
CPC ...... G01S 13/931; G01S 13/867; G01S 13/04; G01S 2013/9314; G01S 2013/9332;
(Continued)

(56) References Cited

U.S. PATENT DOCUMENTS 6,845,317 B2 1/2005 Craine
7,642,922 B2 1/2010 Itou
(Continued)

FOREIGN PATENT DOCUMENTS

EP 2 949 536 A1 12/2015

OTHER PUBLICATIONS

European Search Report dated Mar. 17, 2017, corresponding to European Patent Application No. 16177118.3.

*Primary Examiner* — Daryl Pope
(74) *Attorney, Agent, or Firm* — Squire Patton Boggs (US) LLP

(57) ABSTRACT

The invention regards a method and a system for assisting a driver in driving a vehicle, as well as a vehicle with such system being mounted thereon. Information on an environment of a vehicle is obtained by sensing the environment. Furthermore, information on applicable traffic rules is obtained. A request from a driver is determined from sensing at least one of a driver's utterance, gestures, gaze and operation of vehicle control. The traffic scene as sensed is assessed on the basis of the environmental information, the applicable traffic rules and the determined driver request. Information as requested to be output is generated in response to the determined request of the driver. Finally the information in response to the request from the driver is output.

21 Claims, 4 Drawing Sheets

(51) Int. Cl.
*B60W 50/08* (2012.01)
*G08G 1/0962* (2006.01)
*G08G 1/14* (2006.01)
*G08G 1/16* (2006.01)

(52) U.S. Cl.
CPC ......... *G08G 1/09626* (2013.01); *G08G 1/143* (2013.01); *G08G 1/166* (2013.01)

(58) Field of Classification Search
CPC ..... G01S 2013/9353; G01S 2013/9357; G01S 2013/936; G01S 17/936; G01S 17/33; G01S 17/09675; G01S 17/096758; G01S 17/096708; G01S 17/096872; G01S 17/096855; G01S 17/096844; G06K 9/00791; G06K 9/00805; G06K 9/00798; G06K 9/00812; G06K 9/00818; G06K 9/00825; G06K 9/00832; G06K 9/00845; B60R 2300/00; B60R 2300/302; B60R 2300/70; B60W 30/18; B60W 30/18009; B60W 30/095; B60W 50/08; B60W 50/082; B60W 50/085; B60W 50/087; B60W 50/10; B60W 50/14; B60W 2040/089
USPC .............. 340/901–905, 425.5, 435, 436, 937
See application file for complete search history.

(56) References Cited

U.S. PATENT DOCUMENTS

| | | | |
|---|---|---|---|
| 8,233,919 B2* | 7/2012 | Haag | G06Q 50/26 340/539.13 |
| 8,629,784 B2* | 1/2014 | Szczerba | G01S 13/723 340/438 |
| 8,629,903 B2* | 1/2014 | Seder | G01S 13/723 340/980 |
| 9,047,649 B2* | 6/2015 | Haag | G06Q 50/26 |
| 9,302,678 B2 | 4/2016 | Murphy et al. | |
| 9,650,056 B2* | 5/2017 | Heckmann | B60W 50/08 |
| 9,747,812 B2* | 8/2017 | Misu | G09B 9/04 |
| 2002/0022927 A1* | 2/2002 | Lemelson | G01S 19/11 701/301 |
| 2005/0273218 A1* | 12/2005 | Breed | B60C 11/24 701/2 |
| 2007/0268146 A1 | 11/2007 | Itou | |
| 2010/0253489 A1* | 10/2010 | Cui | G01S 13/723 340/425.5 |
| 2010/0253539 A1* | 10/2010 | Seder | G01S 13/723 340/903 |
| 2010/0253595 A1* | 10/2010 | Szczerba | G01C 21/365 345/7 |
| 2013/0030811 A1 | 1/2013 | Olleon et al. | |

* cited by examiner

METHOD AND SYSTEM FOR ASSISTING A DRIVER IN DRIVING A VEHICLE AND VEHICLE ON WHICH SUCH SYSTEM IS MOUNTED

BACKGROUND

Field

The invention regards a system and a method for assisting a driver in driving a vehicle and also the vehicle on which such system for assisting a driver is mounted.

Detailed Description of the Related Art

During the last years, driver assistance systems have been rapidly developed in order to increase the comfort for a driver and also the safety of driving. Such assistance became particularly important because the traffic density increased over the years. As a consequence, drivers nowadays are frequently faced with truly complex traffic situations. In such situations it is advantageous if the driver is assisted by a driver assistance system so that responsibility for perceiving the traffic situation does not lie with the driver only. It is already known that the environment of the vehicle on which such assistance system is mounted, is sensed and that based on such physical environment sensing a representation of the environment is generated. On such representation, an analysis of the traffic situation may be performed. For sensing the environment, the vehicles are equipped with the sensors like radar or lidar sensors or an image processing system is mounted on the vehicle. Such image processing systems include a camera and in a processing unit, the signals from the camera are processed so that objects in the environment of a vehicle can be recognized. Usually, the sensors are mounted in a distributed manner on the vehicles in order to enable a 360° surveillance around the vehicle. Such surveillance of course exceeds any attention a human driver may pay. Additional sources of information may be car-to-X communication or the use of a GPS system in order to locate a current position of the vehicle. Such determined position of the vehicle cannot only be used in order to assist the driver in routing, but also to obtain additional information to enhance the environment representation.

Known driver assistance systems perform an evaluation of the scene and can present warnings or notifications to the driver. The information that is presented to the driver is determined based on a fixed scheme. As a consequence, the driver will be presented vast information and such information may include also information that he currently does not need, because of his own awareness of what happens in the environment of his vehicle. This results in an increased attention the driver has to pay to the notifications in particular in systems that use a close cooperation between the driver and the system. An example for such close cooperation is semi-automatic driving, where the driver and the assistance system together solve challenges of the driving task.

On the other side, systems have been developed that analyze the awareness of the driver in order to warn him or recommend a safe way of driving. U.S. Pat. No. 7,642,922, for example initiates a dialog with the driver and from the dialog the driver state is determined. If the system recognizes that the driver awareness of the situation or of his behavior is not sufficient suggestions to the driver are output. But a disadvantage of such system is that the interaction with the driver takes place in a relatively obtrusive system initiated way. Such obtrusive system may therefore further disturb the driver's concentration and therefore finally may even cause a higher risk. In particular, the determination of the driver state takes additional time before a warning can be presented to a driver.

In order to reduce the distraction of the driver, it was suggested in EP 2 949 536 A1 that the driver himself may delegate particular observation tasks to the system. The system then evaluates a perceived traffic scene only with respect to this task and thus the information that is presented to the driver in response to his request is well suited and only comprises the requested information. Thus, it can be avoided that the driver is presented with a lot of unnecessary information, because he already recognized the scene properly. Thus, the burden for the driver to filter the presented information for a piece of information which is currently of interest can be avoided.

On the other side, it is known from U.S. Pat. No. 6,845,317 B2 to inform the driver about a current speed limit automatically in case that he currently is violating such speed limit. But here again, the information that is presented to the driver is based on fixed rules that do not take into consideration the current need of the driver for information. Thus, if a driver intentionally drives above the speed limit, he will be annoyed by repetitively being warned and informed about the speed limit.

SUMMARY

It is therefore a target of the invention to improve the assistance in driving by presenting information to the driver which is in fact needed by the driver in the current traffic situation.

This is achieved by a method, system and vehicle according to the present invention.

According to the inventive method and system, at first information on an environment of the vehicle is obtained. Such information may for example be obtained by physically sensing the environment of the vehicle by sensing means comprising for example at least radar sensors, lidar sensors, car-to-X communication, camera systems or the like. In general, any sensor or sensor arrangement can be used that is capable of sensing objects like for example other vehicles or lane markings or the like from which an analysis and interpretation of a traffic scene can be derived. Furthermore, information on applicable traffic rules is obtained. Contrary to currently known systems, the information on the environment and the information on applicable traffic rules are combined to give an improved analysis of a traffic situation. In order to tailor the information that is finally presented to the driver's needs, a driver's request is determined. The determination of the driver's request is based on sensing at least one of a driver's utterance, gestures, gaze and operation of vehicle controls. It is particularly preferred to base the determination of a driver's request on a speech command by the driver in which he defines the information he wants to receive. The traffic scene that is sensed by the sensing means in order to obtain information on that traffic scene is then assessed on the basis of the environmental information, the applicable traffic rules and the determined driver's request. Thus, a requested information to be output as a response to the driver's request can be generated. The requested information is then finally output to the driver in the response. By assessing the traffic scene on the basis of the environment information, the applicable traffic rules and the determined driver request, it is ensured that the driver is not overloaded with any information that can be derived from the traffic scene only or any information about the current speed limit, like in the state of the art. But the response that is given to the driver contains only the requested information that is considered to be relevant by the driver. The driver will therefore not be distracted in his concentration on other aspects of the traffic scene.

The dependent claims define advantageous aspects of the invention.

It is in particular advantageous to provide additional information that can directly be used by the driver of the ego-vehicle. Such additional information is generated on the basis of a second level request that is determined on the basis of the determined driver request, considered as first level request. On the basis of the sensing of a driver's utterance, gesture, gaze and operation of vehicle controls, a driver request is determined. Such request is directed to an information the driver needs to assess the traffic situation by himself. The determination of the second level request goes one step beyond and considers why the ego-vehicle driver in fact requested such information. Thus, the additional information is output in response to the second level request. It is particularly preferred that the outputting of such additional information is announced in the response that is given as a reaction to the determined request. Thus, while the response directly answers the driver's request, the additional information can be given at a later point in time and may not include all information necessary to give an answer to the driver's request but assist the driver by presenting information considered useful from an analysis of the determined driver request.

It is in particular advantageous to furthermore determine a driving intention of the driver. In order to determine the driving intention, the driver is sensed while he is driving the vehicle and the determined intention, for example an intended trajectory like a left turning maneuver or another maneuver is taken into account when assessing the traffic scene. Determining such driving intention further assists in tailoring the requested information, because it can be avoided to generate information on aspects of the traffic scene that is currently not relevant for the driver. In particular, for example, if a plurality of traffic objects in the environment of the vehicle can be perceived knowledge about the driving intention of the driver helps to distinguish between relevant and irrelevant other traffic participants. The further analysis can thus be focused on the relevant traffic participants.

In order to determine such driving intention, the system may preferably use in addition to a microphone that can be used to receive speech commands from the driver also a camera system directed to the driver. With such camera system and the image processing, it is possible to generate supplementary information with respect to the driver's request. The eye direction of the driver or a gesture can also be used to infer an intended driving direction. This information is advantageously combined with the operation of vehicle controls by the driver.

It is particularly preferred to use as a basic piece of information in determining the driver requested information and/or the driving intention, information that is given directly by the driver using speech commands. The vehicle and the system therefore comprise a microphone and internally process the utterances of the driver in a data processing unit. With such speech commands, which can be either specifically defined speech commands or freely formulated commands, the driver defines his need for information. From the speech command, the system will then interpret the requested information and tailor its output respectively.

Furthermore, it is preferred that the output means of the system for outputting the response and/or additional information includes at least one of a speaker, a head up display and a display. It is particularly preferred that output is performed by a speaker. Advantageously, the system comprises a plurality of such output means and the method chooses the modality of outputting the response and/or additional information in accordance with the information to be output. Thus, it can be ensured that for different kinds of information the way of outputting the response and/or additional information is chosen appropriately so that its content can be easily recognized by the driver without distracting him.

It is furthermore preferred that the traffic scene assessment also uses map data. By use of such map data, further information can be taken into consideration. In particular, the assessment then is not limited to what can be derived from environment sensing, but also take into consideration aspects of a traffic scene that are for example hidden at the moment.

According to one preferred embodiment, the system and method are intended for presenting in the response information which of the perceived traffic objects has right of way. Thus, in the request the driver asks the system to inform him who has right of way, the system thereafter from the sensed environment at first identifies the vehicles that are included in the traffic scene and assesses the traffic situation using its knowledge about the applicable traffic rules and the environment representation. Thus, for generating information to be output in the response the system identifies the one (or more) traffic object which has right of way and outputs the respective information to the driver in the response.

According to another preferred embodiment, information on parking regulations are output in the response. Thus, the system and method determine for an area, where it would be possible to park a car or another vehicle if parking is allowed there or not. Such evaluation can be based on general rules or specific rules that are indicated by a traffic sign. The information about general traffic rules, comprising not only parking regulations, but also general speed limits and the like, are preferably addressed by a database. But in particular specific traffic rules like a reduced speed limit can also be inferred from the sensed environment. When informing the driver about parking regulations, it is in particular preferred that the system will not only base the determination of the driver request on a speech command, but also take into consideration and combine with the information analyzed from the speech command, a gesture by the driver.

The gesture can be either a pointing gesture with a hand but alternatively it could also be used an eye direction, because the driver usually looks into the direction of the place of interest when formulating a request.

A further advantageous embodiment comprises the provision of information on currently applicable speed limits. Thus, by the environment sensing the system recognizes the road on which a vehicle is driving and thus is capable of determining if currently the general speed limit is applicable or if a specific speed limit is applicable that is indicated by means of the traffic sign. Thus, by combining the sensed information with knowledge about the traffic rules in general the system is capable of identifying currently applicable speed limit and presenting it to the driver. This could also include conditioned speed limits that are for example valid only in case of wet roads. Thus, by sensing the environment or the controls of the vehicle the system can determine if it is currently raining or if the road is wet. Combining this with the knowledge about the general speed limit and a detected traffic sign the system is thus able to decide which of the plurality of currently available speed limits for the particular road is in fact applicable.

It is to be noted that in general the system may also use the results of a GPS (global positioning system) in order to determine the current location of the vehicle. In particular the output of information on speed limits can also be based on use of map data. Map data in which fixed speed limits are annotated are commercially available.

According to another embodiment the system can output a response including suggestions for safe driving speeds. Thus, in an arbitrary driving situation the driver can ask the system what is a suitable driving speed for this situation, for example for a curve of the road ahead. By analyzing the curvature from the environment sensing the system can then estimate what is a suitable speed for driving. The system can furthermore take into consideration road conditions, like wet road, snow or the like. Thus, having additionally the knowledge about the traffic regulations the system can decide if the applicable speed limit is suitable or if it is recommended to further reduce the speed in order to avoid slip. After such decision is taken then the recommended information is output. Thus, again the information from sensing the environment and the knowledge about the applicable traffic regulations are combined and analyzed in view of the requested information that is determined in advance. The system in general outputs only such pieces of information which are needed to match the desires of the driver.

According to the invention the driver is also provided with information including a recommended driving behavior for the current driving situation. Thus, if the driver for example recognizes that an emergency vehicle like an ambulance or police car is approaching but he does not know how to react because he is standing at traffic lights showing a red light he will be assisted. The database in which the traffic regulations are stored on the basis of which the system assesses a traffic scene includes an information that in such a case it is allowed to drive into the intersection despite the red traffic lights. It is to be noted that the database may contain traffic regulations defined by law but also for example local traffic habits to give recommendations that are in line with the usual driving behavior in that country or region.

It is in particular preferred to adapt the information and/or additional information and/or how the information and/or additional information is output to the driver to each driver individually. To achieve this, individual driver models can be used. The individual models are updated each time an interaction between a driver and the system takes place. The models are used to determine the request and in particular their parameters are adapted. To achieve a proper driver model, the feedback or spoken preferences of the driver can be stored and thus the history of interactions can be used.

The database that is accessed in order to obtain the information on traffic regulations may either be mounted on the vehicle and thus is part of the system or may be a remote database that is accessed by respective communication means of the system.

BRIEF DESCRIPTION OF THE DRAWINGS

Further features and advantages may become apparent from the following explanation which describes preferred embodiment with reference to the annexed drawings. It is shown in FIG. 1 a block diagram of the system according to the present invention.

DETAILED DESCRIPTION

Figure 1:
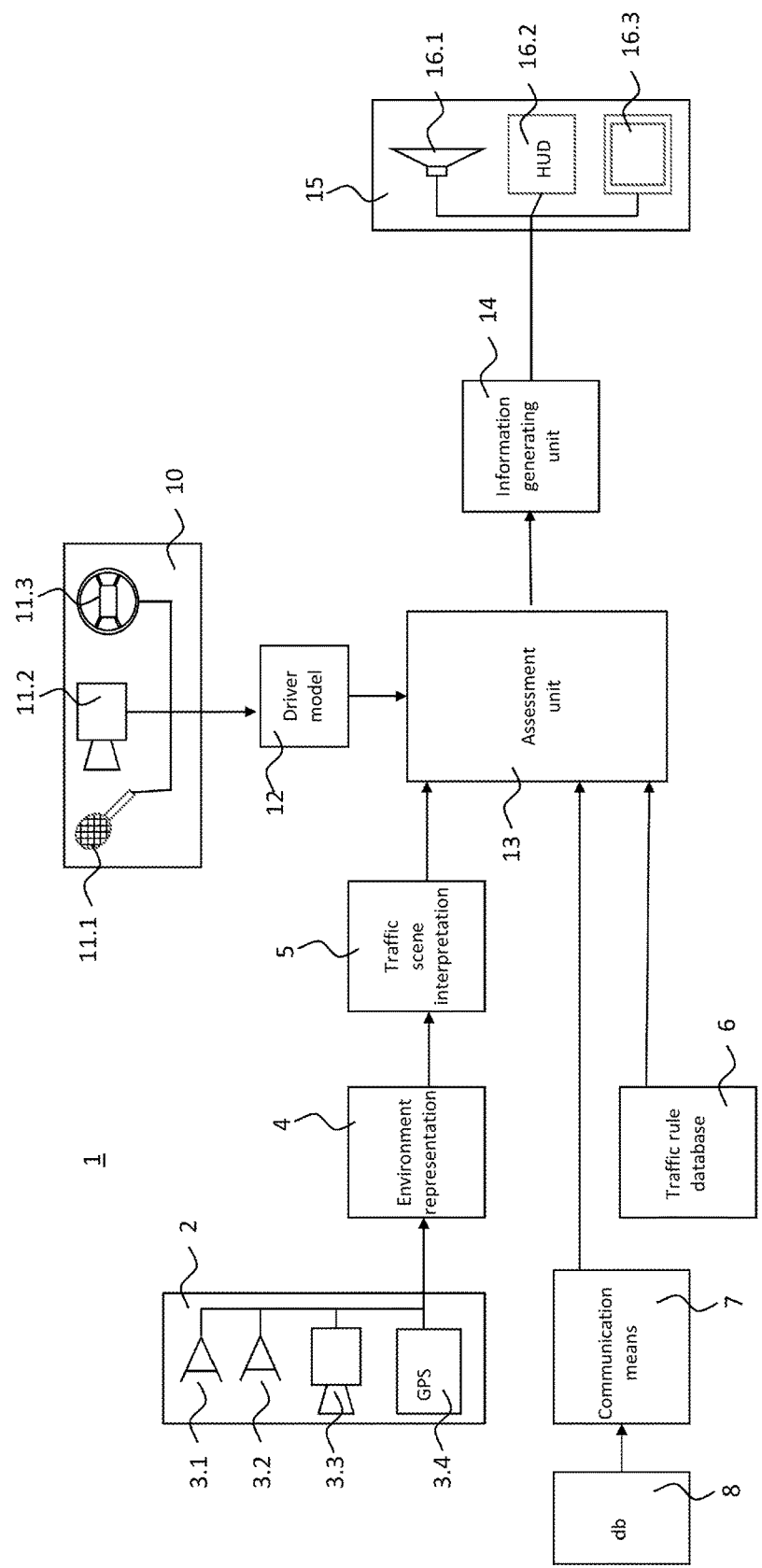

FIG. 1 shows a simplified block diagram of a system 1 that is intended for assisting a driver in driving a vehicle. The system 1 is mounted on a vehicle and comprises sensing means 2. The sensing means 2 may comprise a plurality of sensors that are mounted in a distributed fashion over the vehicle. Thus, with the sensors it is possible to achieve a 360° surveillance of the vehicle's environment. The sensors may particularly be radar sensors 3.1, lidar sensors 3.2, a camera system 3.3 and a GPS system 3.4. The sensing means 2 may in particular comprise a plurality of those sensors of different types.

The signals that are generated by the sensors 3.1 to 3.4 by physically sensing the environment of the vehicle are supplied to an environment representation generating unit 4. In the environment representation generating unit 4 a representation of the environment based on the sensor signals is generated. Generally such environment representation generation 4 per se is known. It is in particular important that by sensing the environment by means of the sensors 3.1 to 3.3 traffic objects in the surrounding of the vehicle can be perceived. In addition to recognizing the existence of such objects also velocity, heading or the like may be determined for the traffic objects. The environment representation that is generated in the environment generation representation unit 4 is then forwarded to a traffic scene interpretation unit 5. In the traffic scene interpretation unit 5 a traffic situation is determined. This means, that the information that is objectively gathered from the environment sensing is then interpreted with respect to the context and the relationship between the different identified objects. Thus, a traffic situation, like recognizing a crossing with interpreting and predicting the behavior of the individual traffic participants can be derived.

Furthermore, the system 1 needs information about the applicable traffic rules. The applicable traffic rules may either be stored in a traffic rule database 6 being stored in a memory of the system 1. Alternatively the system may also be in communication with a remote database 8. The remote database is accessed via a communication means 7 of the system 1. This has the advantage that at any time it is sufficient to update the remote database 8 and then always have up to date information on applicable traffic rules. In addition the system 1 comprises sensing means 10 that are used to determine on the one side an intended driving behavior of the driver and on the other side the requested information. The sensing means 10 may advantageously comprise a plurality of sensing units. These sensing units may include a microphone 11.1, a camera 11.2 and/or sensors that allow observing operation of vehicle controls like a steering wheel, brake, turning light switches and so on. The signals generated by the sensing means 10 from sensing a driver while driving the vehicle are supplied to a driver modeling unit 12. In the driver model firstly the requested information from the driver is determined. One central aspect when determining the requested information is an analysis of the utterance of the driver. As mentioned earlier the driver preferably uses spoken commands in order to define the information he desires to receive. It is particularly preferred that the sensor signals that are also fed to the driver modeling unit 12 are used in addition to the spoken command. As mentioned above in particular gestures, eye directions and the like may be used to limit an area of interest so that a speech command with rather general definition of requested information can be enhanced by limiting the identified request to a particular area. This will become even clearer when taking into consideration examples of traffic situations that will be explained with reference to FIGS. 3 to 5.

The sensing means 10 and the driver model 12 are not only used to determine the requested information but also may be used to determine an intended driver's behavior. This means that on the basis of the vehicle controls that are operated by the driver or even by spoken information it is possible for the system 1 to recognize an intended trajectory, an intended driving maneuver like for example a turning movement or the intention to find a parking space. The latter for example can be recognized if from the eye direction it can be gathered that the driver always looks to other vehicles that are parking alongside the road and also his driving speed is reduced compared to his usual driving. Thus, here individual aspects of currently driving person are taken also in consideration. In order to determine the driving speed being unusual low other information from the system may also be used. For example it has to be distinguished between the need of reducing the driving speed because of a preceding vehicle or if there is a free lane ahead of the vehicle. Then, it could be concluded that the slow driving is performed intentionally.

The previous description was based on the fact that in a current situation a spoken instruction or command is received from a host vehicle driver and that the response is generated on the basis of this actual spoken instruction. During use of the inventive system 1 the driver usually makes use of the system's capabilities repeatedly. Preferably, these spoken instructions can be stored. The commands or the request analyzed from the command are stored associated with the traffic scene context. Thus, since the driver assistance system 1 can permanently monitor the environment and thus remember similar traffic scenarios in a current scenario the system can autonomously generate information that is likely to be reasonable again. The corresponding settings of the system may then be retrieved from a memory. Alternatively only information on usually requested information is retrieved from the memory and the system assessed the traffic situation newly.

The system 1 may use a generic driver model 12. But advantageously, the history of interactions between the driver and the system 1 is used to generate individual driver models 12. To achieve such personalized model 12, the interactions between the driver and the system 1 is analyzed. The interactions are observed and stored associated with the respective driver. In particular, if the driver gives feedback, for example to the timing when the system 1 shall be output, the requested information is stored for each driver individually. But also the determination of intended driving behavior can be optimized so that in the end the situation analysis is improved. Other sources of information about the driver may also be exploited.

The individual driver models may in particular include preferences of the driver. One example is a level of detail of the information presented to the driver. As mentioned above the system is capable of receiving and storing feedback that is given by the driver after he received the output information (either the information output in the response or the additional information). The amount of information that is given might initially be set by a default setting. If then the driver repeatedly asks for more detailed information, the preferences regarding a level of detail with respect to this individual driver can be set to more details. Of course, this is also possible the other way round in case that the driver indicates in his feedback that he only needs less information.

But not only feedback given by the driver directly can be used to adapt the output information individually. For example, if one particular driver requests the system for several times in the same area at the same time of day if he can park here, the system might directly take into account the duration the driver parked there before. Thus, information on the driver's behavior is stored and can be exploited to adapt the driver's model. If then the system receives a new request from the driver, knowledge about the previous parking durations is used in order to directly indicate those parking spaces to the driver which allow him to park for the length of time he parked previously.

Another example for a source of information that can be used to adapt the individual driver models is a smartphone of the driver which usually is connected to an infotainment system of the vehicle, for example by Bluetooth. Thus, information that is present on the smartphone can be analyzed by the system 1. By analyzing information from the smartphone it is for example possible to determine the nationality of the driver. The driver might for example not be a national (or a resident) of the country where the trip started. This is particularly the case if he is the driver of a rental car. When then the driver requests information on traffic rules for the current situation, the system might explain them by referring to rules well known to the driver, in particular to rules applicable in his country of origin or residence. Thus, information about applicable speed limit might be for example "the speed limit on rural roads are the same as in your home country".

All this information is then fed to an assessment unit 13. The assessment unit 13 has knowledge about a traffic situation which is interpreted from the environment representation in the traffic scene interpretation unit 5. From the traffic rule database 6 or the communication means the assessment unit 13 is provided with information about traffic rules. As mentioned above such traffic rules may either be general traffic rules or may also be regional driving practice. The assessment unit 13 is furthermore provided with the analysis result of the driver model 12 and thus information on the requested information a response to which has to be generated. In the assessment unit 13 an analysis of all these different aspects is performed which means that the information is combined. Thus, from the requested information it is determined what aspects of the traffic situations are relevant for generating a response to the request from the driver. For example if the driver requests information on priority rights at an intersection it is checked at first by the assessment unit 13 which priority rights have to be taken into consideration at that particular intersection. In order to correctly assess such priority rights the system uses information on general priority regulations of the respective country or area taken from the traffic rule database 6 but also information that is derived from the environment representation. The environment representation may for example include information about traffic signs, traffic lights or the like. In the assessment unit 13 this information is considered commonly so that the regulations that are applicable in the currently encountered traffic situation are used. Then the other traffic participants are analyzed with respect to their relation to the identified priority regulations. Thus, after having determined the applicable traffic regulations the traffic situation is further analyzed with regard to these regulations so that in response to the driver's request tailored information can be presented. This information is then output and forwarded to an information modality selector 14. In the information modality selector 14 one of a plurality of output modalities is chosen. The selection can for example be based on key words that are included in the information to be output. If for example the information includes a direction where the attention of the driver shall be drawn to it is possible to indicate the direction visually. On the other side in many cases a speech output is preferred, since such speed output can easily be grasped by the driver without the need that he turns his head or changes his eye direction. After selecting a proper output modality the signal including the information is supplied to an output means 15. The output means 15, for example comprises a speaker 16.1, a head up display 16.2 and/or a display 16.3 mounted for example on the dashboard of the vehicle.

Figure 2:
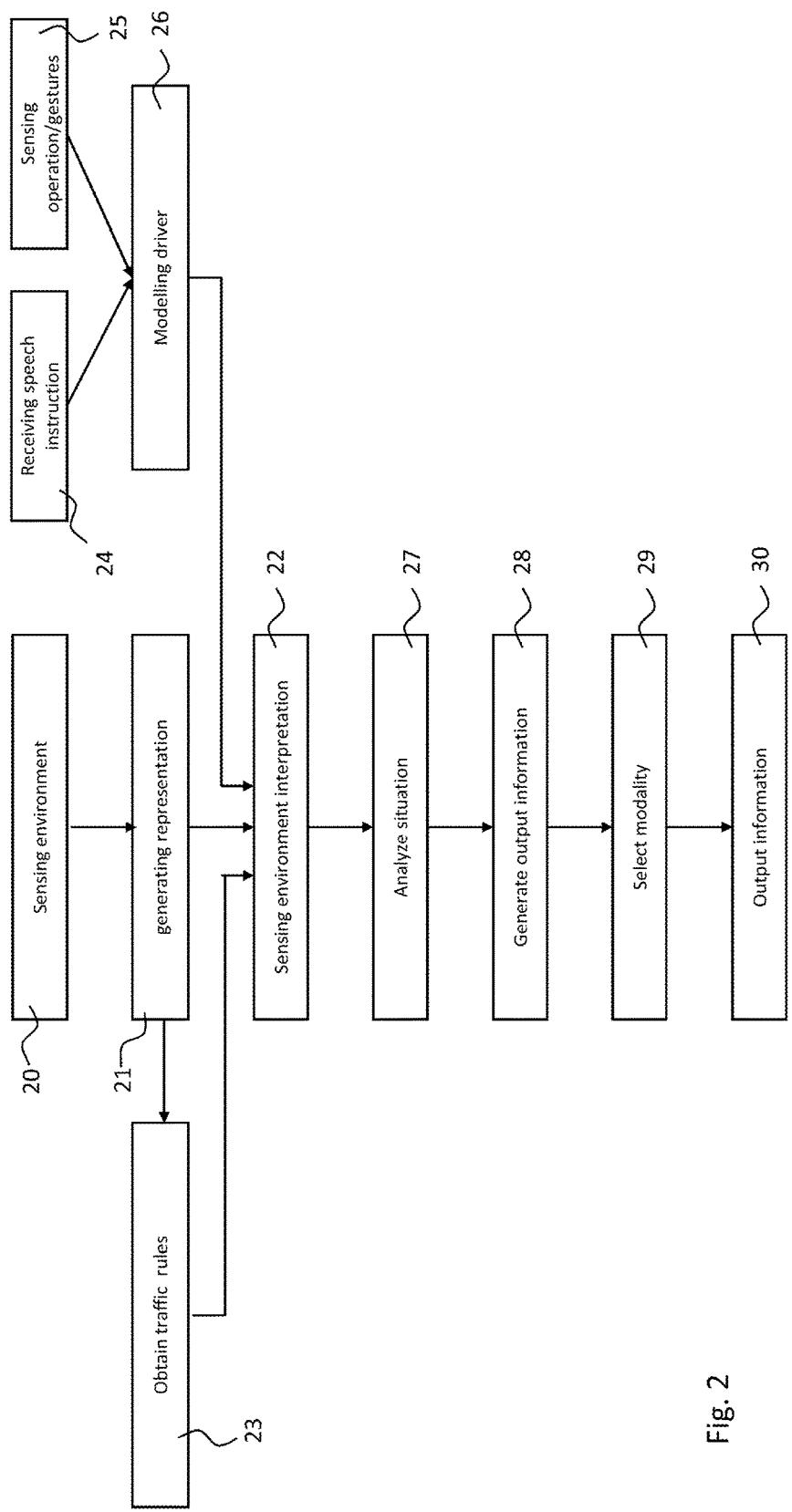
FIG. 2 a simplified flow chart for explaining the steps of the current invention.

In FIG. 2 there is shown a simplified flowchart of the inventive method. At first, in step 20 the environment of the vehicle is sensed. The signals generated by the sensing means 10 are then processed in order to generate an environment representation 21. The result of the environment representation is used to perform a traffic scene interpretation 22. Furthermore, the result of the environment representation generated in step 21 is used to identify applicable traffic rules in step 23. In step 23 also, generally applicable traffic rules that are obtained from databases as described with respect to FIG. 1 are analyzed and the identified applicable traffic rules of step 23 are used to analyze the traffic situation in step 27. Also, the requested information is used to analyze the traffic situation. For determining the requested information, a speech input is received in step 24 by means of a microphone. In addition, also the driver's gestures or operated controls by the driver are sensed in step 25. The received speech commands and the sensed control operation and/gestures of steps 24 and 25 are used to model a driver in step 26. The output of the driver modeling includes information on the requested information which is supplied and is the basis for analyzing the traffic situation in step 27 in combination with the traffic scene interpretation of step 22 and the traffic rules of step 23.

After analyzing the traffic situation on the basis of this information, output information is generated in step 28. The output information basically comprises the content of the information which is then used to select a modality for outputting the information in step 29. Thus, in step 29, the system selects if the information is output as a response by outputting speech, by displaying the information on a display 16.3 or a head up display 16.2 or if the response is output haptically. Such haptic output of information could be for example vibration of the steering wheel or generating forces on a seat, paddles or the steering wheel.

Finally, the information in response to the driver's request is output in step 30. The invention will become clearer when taking into consideration, situations and the process for generating information output in response to a driver's request as it will be described with respect to a plurality of examples in FIGS. 3 to 5.

It is to be noted that all the data and signal processing can be executed by a single processing unit or a plurality thereof.

Figure 3:
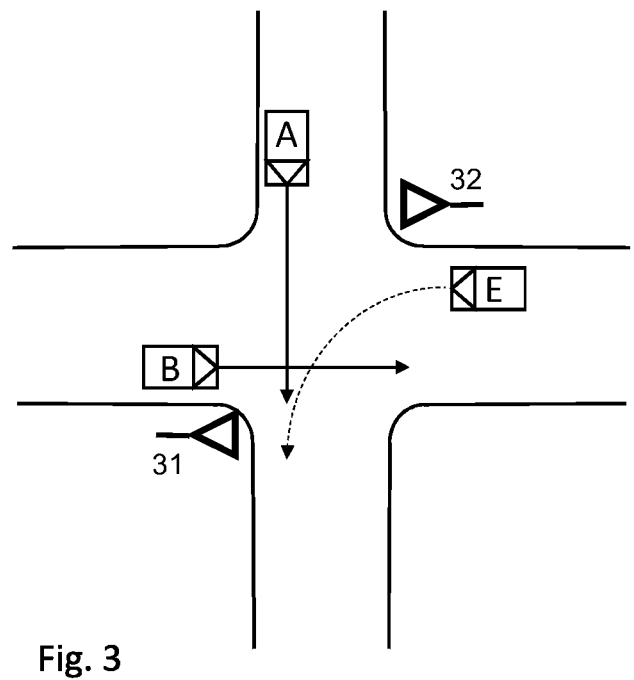
FIG. 3 a first traffic situation as an example for the functioning of the present invention.

FIG. 3 shows a top view of an intersection. The vehicle E on which the inventive system 1 is mounted is approaching the intersection. Its intended driving trajectory is indicated by the dashed arrow.

At the intersection that is observed by the sensing means 10 of the system 1, two other traffic participants are also approaching. At first, from the right relative to vehicle E there is approaching a vehicle A. And furthermore driving opposite direction of ego-vehicle E there is approaching a further vehicle B. As indicated by the traffic sign 32 and 31, vehicles E and B have to give way for vehicle A, which is driving on a priority road. When approaching the intersection, the driver of vehicle E may ask the question "Which car has the right of way?". The system will use the results of the environment sensing which gives information on vehicle A, vehicle B as well as the traffic sign 32. Thus, the system 1 generates an environment representation in which the intersection itself with the two roads, vehicle A, vehicle B and at least traffic sign 32 is represented. It might be that traffic sign 31 cannot be identified by the system because it is sensed only from the back.

The system 1 will obtain information on the priority rights from the traffic rule database 6 and thus conclude that at first, vehicle A can cross the intersection. Furthermore, from the sensing of the driver, the system can determine that the intended trajectory of vehicle E corresponds to the dashed arrow, for example, by the turning light lever of vehicle E being operated so that the turning lights on the left side of the vehicle E are flashing. Thus, since the traffic rules that are stored preferably in a database of system 1, the system 1 can also conclude that after vehicle A has passed, also vehicle B has priority. Thus, it generates information which conveys to the driver of vehicle E that the driver has to let pass vehicle A first, then vehicle B before he can perform his turning maneuver. An output of the system 1 may be spoken information which is preferred. Thus, in the present traffic situation a response could be that "the red car approaching from the right has priority and after that you have to let the blue station wagon pass". As indicated in the example of a response, it is possible to improve legibility of the responded information by identifying other traffic objects by mentioning their characteristic, for example the color of the car. This allows an easy understanding of the information and avoids any misinterpretation of the response.

Furthermore, the system might also announce that it will inform the driver when all other traffic participants who have right of way have passed such that the driver can then immediately start his intended maneuver. At the end of the response as depicted above ("The red car approaching from the right has priority and after that you have to let the blue station wagon pass.") the system may first utter "I will notify you when you have the right of way". While the last relevant traffic participant before vehicle E may drive on is passing the system 1 might utter "after the blue station wagon has fully passed you have the right of way" thereby outputting additional information. Presenting this additional information slightly before the driver can start his maneuver will also give the driver some time to prepare himself. Of course such additional information that is given at a point in time when the driver can start his intended driving maneuver or at least prepare his intended driver maneuver can be output in addition to the response even without announcing giving such additional information. For generating such additional information the system 1 determines from the driver's utterance not only a driver request but also reasons what the motivation for such request was. In the present case obviously the driver wants to know when he can perform his turning maneuver. So the additional information is given as a response to a second level request that is determined from the determined driver request. Such second level requests can be defined in a table that associate second level requests to determined driver requests.

Figure 4:
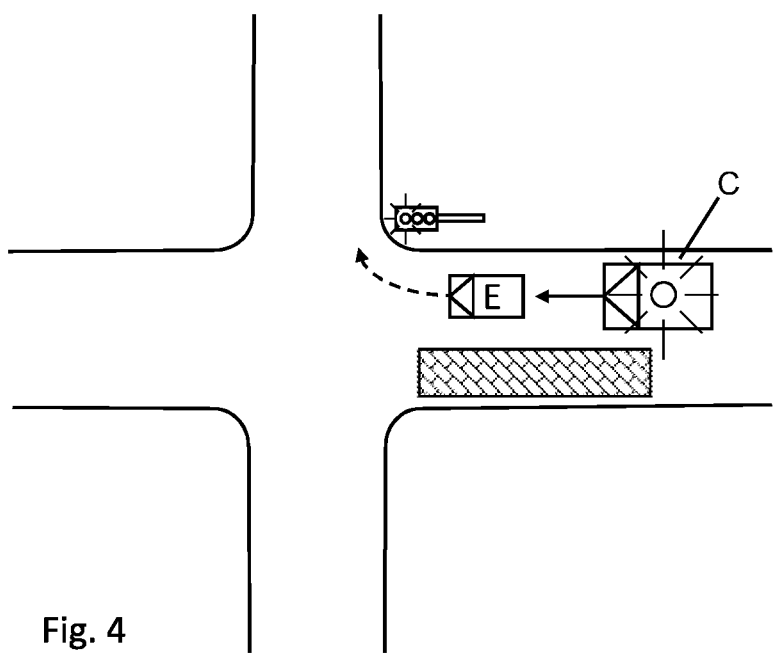
FIG. 4 a second example for illustrating the functioning of the present invention, and FIG. 5 a third example for illustrating the functioning of the present invention.

Another situation is depicted in FIG. 4. Here, the vehicle E is standing at red traffic lights and an ambulance C is approaching from behind. The opposing lane is currently blocked and thus the ambulance may not simply overtake vehicle E. A question uttered by the driver may be "How should I yield to the ambulance I'm hearing?". The response of the system could be spoken information again "Slowly enter the intersection in front of you despite the red traffic light". From that example it becomes apparent that this system will not only include general traffic rules like the meaning of a red light that the driver is not allowed to enter the crossing, but also uses exceptional rules which only apply in a certain context. As the system analyzes the traffic situation and thus has knowledge about the presence of, for example an ambulance or police in the illustrated situation, it is then capable of distinguishing between the applicability of a general rule or an exceptional rule.

There may also be situations where from the sensing of the environment different types of other traffic participants can be identified. For example, vehicles can be classified into busses, trams, cars and the like. If the spoken command or question from the driver, for example is "Does the tram crossing from the right has the right of way?", the information can be limited to this particular aspect. Thus, if there is approaching a tram, the system will limit the output information to the question of priority of the tram, even if there are other traffic participants perceived in the scene. In that case the system may answer "Yes, the tram has the right of way".

Figure 5:
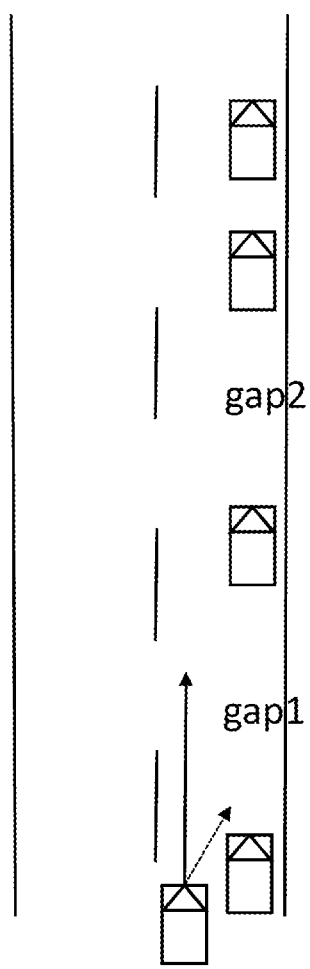

FIG. 5 shows a further example of a traffic situation. The driver of vehicle E is driving straight on a road where a plurality of vehicles park on the right side of the road. Between the parking vehicles, two gaps 1 and 2 are present, both suitable for parking vehicle E. The driver spotted a gap-gap 1 which is more convenient for him and is interested in parking his vehicle E there. But he is not sure if he is allowed to park there. He thus asks the system "Am I allowed to park here?". From that question, the system 1 in first place cannot decide for sure which of gaps 1 and 2 is addressed by his questions. It is assumed that based on sensing the environment, the system is capable of recognizing gap 1 as well as gap 2. But the system 1 further comprises sensing means 10 that observe head movements and eye directions as well as gestures of the driver. Thus, since the eye direction as indicated by the dotted arrow usually is in direction of the gap of interest, the system can determine that the requested information concerns only gap 1. Thus, the system will analyze the traffic situation with respect to gap 1 only. Again, traffic signs that are sensed by a camera system are analyzed and compared to rules that have to be inferred from the respective traffic sign, for example. Alternatively, also map information can be used to determine if parking is allowed at a position of gap 1. In order to be sure which of the traffic signs is currently valid, the system 1 will while driving continuously analyze the traffic signs and label areas in the environment representation accordingly. Thus, if it is clear from a traffic sign which was already passed by vehicle E that parking is allowed in this area, but only for a limited time, the system might reply "You are only allowed to park here for one hour. After that, this space is reserved to residents".

Since the system preferably has access to maps including information on points of interest for example parking spaces, the system might then even suggest an alternative parking space. If the request from the driver comprises additional information like for example an intended parking duration this can also be taken into consideration. In that case the system might respond for example you are not allowed to park for your intended duration "You will find an alternative parking space in a parking lot 500 meters ahead".

According to the invention the system 1 may also assist the driver in a more general way. For example the driver crossed a border to a foreign country and thus different traffic regulations are applicable. The driver might not be so familiar with these different traffic regulations and thus after driving for sometime in a foreign country he might have forgotten particular speed limits. Because he is unsure the driver will consequently ask the system for a currently applicable speed limit or for priority regulations for example in a roundabout. One possible question is thus "How fast am I allowed to drive on this road?" or "what is the speed limit on rural roads in the UK?", "Who has priority in a roundabout?" or the like. Again the system 1 will combine the information from the environment sensing, the traffic rule database and the determined requested information. The sensing of the environment is used in order to analyze on what type of road the driver is currently driving but also in order to identify traffic signs indicating a speed limit. The database 6 is accessed in order to further determine the general applicable speed limits so that in case that no specific speed limit traffic sign can be identified still the requested information can be output.

It is obvious that this general information being output in response to a respective request from the driver is not limited to foreign countries but can also be made in the driver's country of origin.

A final example is a driving situation in which the driver needs assistance because he is not sure how to behave because of exceptional conditions. The driver is for example driving on a rural road trough the forest. The road has sharp turns and since it is autumn there are many leaves on the ground. Thus, the driver would like to receive a recommendation for a safe driving speed for these road conditions for the next sharp turn. A question output to the system may be "At what speed should I drive in the corners not to risk to skid?". The system assesse the traffic situation by an analysis of the turn based on for example environment sensing but furthermore based on map data. In addition the road condition is taken into consideration which is based on an identification of the leaves on the ground performed on the basis of the environment sensing. Thus, the system 1 can estimate a recommended maximum speed for safe driving. The system 1 has furthermore knowledge about the speed limit which is set either by a traffic sign or which is generally set because of traffic rules of the country and determine if the recommended speed is lower than the allowed speed. In case that the allowed speed is lower it will output an information that the for example "driving at the current speed limit of 80 km/h will cause no risk to skid". But if the applicable speed limit in that situation is for example 100 km/h it might output the estimated maximum driving speed for example by saying "if you drive slower than 80 km/h you do not risk to skid".

Such output may of course be generated individually for each upcoming turn or for all turns within a certain distance, for example the next two kilometers. The driver may include such information in his spoken command by for example adding "in the corners of the next two kilometers". On the other side, he could mention "the next corner" or "the corner ahead". In that case, the system will determine by analyzing the spoken command that the instruction shall be limited to only a particular corner or turn and that the command thus would be repeatedly given in case the driver wanted respective information for further corners.

The invention claimed is:

1. A method for assisting a driver in driving a vehicle, comprising the steps of:
   obtaining, by at least one sensor, information on an environment of the vehicle,
   obtaining, by an electronic control unit of the vehicle, information on applicable traffic rules,
   determining, from sensing at least one of a driver's utterance, gestures, gaze, and operation of vehicle controls, and by the electronic control unit of the vehicle, a driver request for information on at least one of the applicable traffic rules with respect to a current traffic scene in which the driver requests the information,
   assessing, by the electronic control unit of the vehicle, the current traffic scene by combining and analyzing the environmental information and the applicable traffic rules in view of the determined driver request, wherein the environment information with respect to a current position of the vehicle is used to identify the applicable traffic rules and the identified applicable traffic rules are used to analyze the traffic situation,
   generating, by the electronic control unit of the vehicle, requested information to be output as a response to the determined driver request based on the assessed traffic scene, and
   outputting, by at least one of a speaker, a display, a vibrator of a steering wheel, a generator for generating force on a seat, a generator for generating force on paddles, or a generator for generating force on the steering wheel, the response to the driver.

2. Method for assisting a driver in driving a vehicle, comprises the steps of:
   obtaining, by at least one sensor, information on an environment of the vehicle,
   obtaining, by an electronic control unit of the vehicle, information on applicable traffic rules,
   determining, from sensing at least one of a driver's utterance, gestures, gaze and operation of vehicle controls, and by the electronic control unit of the vehicle, a driver request for information on at least one of the applicable traffic rules with respect to a current traffic scene in which the driver requests the information,
   assessing, by the electronic control unit of the vehicle, the current traffic scene by combining and analysing the environmental information and applicable traffic rules in view of the determined driver request, wherein the environment information with respect to a current position of the vehicle is used to identify the applicable traffic rules and the identified applicable traffic rules are used to analyze the traffic situation,
   generating, by the electronic control unit of the vehicle, a second driver request based on information associating the second driver request to the determined driver request;
   generating, by the electronic control unit of the vehicle, requested information to be output as a response to the determined driver request based on the assessed traffic scene, wherein the response includes information indicating that additional information of the current traffic scene is output to the driver at a later point in time,
   outputting, by at least one of a speaker, a display, a vibrator of the steering wheel, a generator for generating force on a seat, a generator for generating force on paddles and a generator for generating force on the steering wheel, the response to the driver,
   generating, by the electronic control unit of the vehicle, the additional information of the current traffic scene on basis of the second driver request; and
   outputting the additional information at the later point in time.

3. The method according to claim 1, wherein in the determining step, a driving intention is determined based on said sensing, and the assessing of the traffic scene also takes account of the driving intention.

4. The method according to claim 3, wherein the driver request or the driving intention is determined based on speech analysis of a driver's utterance.

5. The method according to claim 1, wherein the requested information is output via at least one of a speaker, head up display and display.

6. The method according to claim 1, wherein the assessing of the current traffic scene uses map data.

7. The method according to claim 1, wherein said at least one of the applicable traffic rules is a priority rule, and
   wherein in the assessing step, it is determined which perceived traffic objects in the current traffic scene has a right of way.

8. The method according to claim 1, wherein the generated requested information includes information on parking regulations with respect to an area depicted by the driver.

9. The method according to claim 1, wherein the generated requested information includes information on a currently applicable speed limit.

10. The method according to claim 1, wherein the generated requested information includes information on estimated safe driving speeds.

11. The method according to claim 1, wherein the generated requested information includes information on a recommended driving behavior for the current traffic scene.

12. The method according to claim 1, wherein for at least one of determination of the driver request in the determining step or for selecting an output modality in the outputting step, an individual driver model is used.

13. A system for assisting a driver in driving a vehicle, comprising:
   sensing means for sensing a vehicle environment to obtain environment information,
   obtaining means for obtaining information of applicable traffic rules,
   determination means for determining, from at least one of a driver's utterance, gestures, gaze, and operation of vehicle controls, a driver request for information of at least one of the applicable traffic rules with respect to a current traffic scene in which the driver requests the information,
   traffic scene assessment unit for assessing the current traffic scene by combining and analyzing the environment information and the applicable traffic rules in view of the determined driver request, wherein the environment information with respect to a current position of the vehicle is used to identify the applicable traffic rules and the identified applicable traffic rules are used to analyze the traffic situation,
   generating means for generating information to be output as a response to the determined request based on the assessed traffic scene, and
   output means for outputting the information in response to the driver's request.

14. The system according to claim 13, wherein the determination means is connected to the sensing means including at least one of a microphone, a camera system, or sensors sensing operation of vehicle controls.

15. The system according to claim 13, wherein the output means includes at least one of the speaker, a head up display, or a display.

16. The system according to claim 13, wherein the sensing means comprises at least one of a radar sensor, a lidar sensor, a camera system, or a GPS.

17. The system according to claim 13, wherein the system further comprises a GPS system.

18. The system according to claim 13, wherein the system further comprises a memory on which a database is stored which comprises information on the applicable traffic rules.

19. The system according to claim 13, wherein the system comprises a communication means for accessing a remote database on which information on the applicable traffic rules are stored.

20. A vehicle including the system according to claim 13.

21. System for assisting a driver in driving a vehicle, comprising:
sensing means for sensing a vehicle environment to obtain environment information,
obtaining means for obtaining information of applicable traffic rules,
determination means for determining, from at least one of a driver's utterance, gestures, gaze and operation of vehicle controls, a driver request for information on at least one of the applicable traffic rules with respect to a current traffic scene in which the driver requests the information,
generating means for generating a second driver request on the basis of information associating the second driver request to the determined request,
traffic scene assessment unit for assessing the current traffic scene by combining and analyzing the environment information and the applicable traffic rules in view of the determined driver request, wherein the environment information with respect to a current position of the vehicle is used to identify the applicable traffic rules and the identified applicable traffic rules are used to analyze the traffic situation,
generating means for generating information to be output as a response to the determined request based on the assessed traffic scene, wherein the response includes information indicating that additional information of the current traffic scene is output to the driver at a later point in time, and
output means for outputting the information in response to the driver's request, wherein
the generating means is configured to generate the additional information of the current traffic scene on basis of the second driver request, and
the output means is configured to output the additional information at the later point in time.

* * * * *